No. 688,963. Patented Dec. 17, 1901.
O. O. OZIAS.
SCALE.
(Application filed Nov. 28, 1900.)
(No Model.)
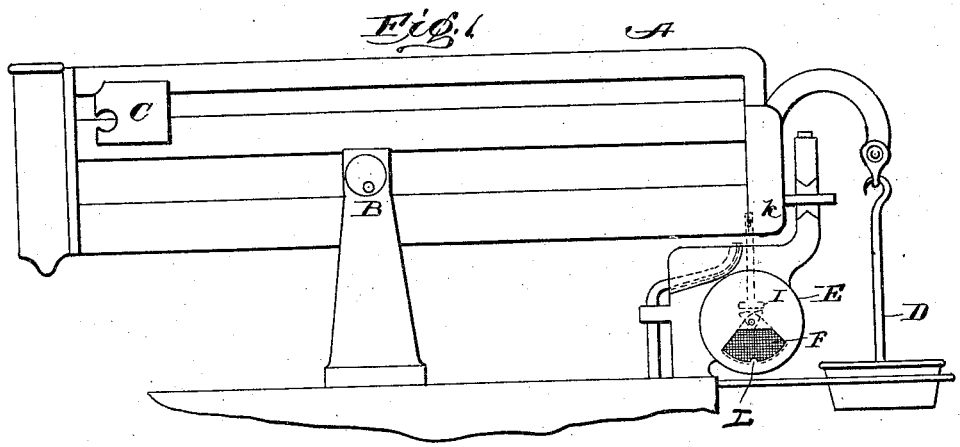
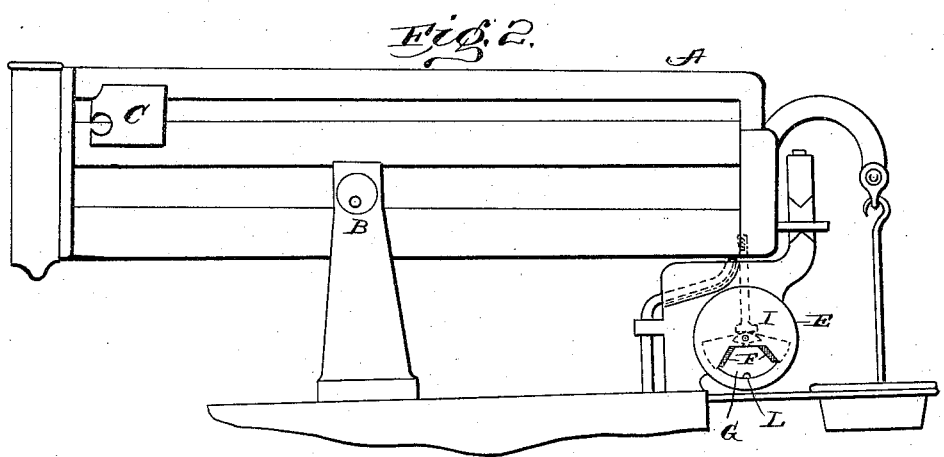
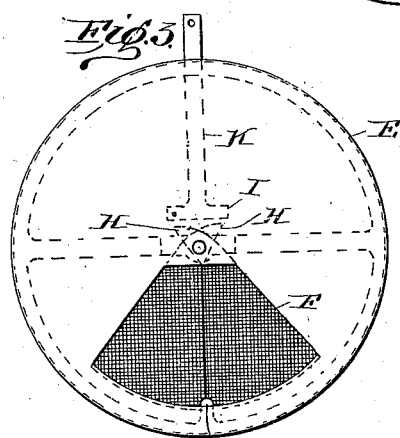
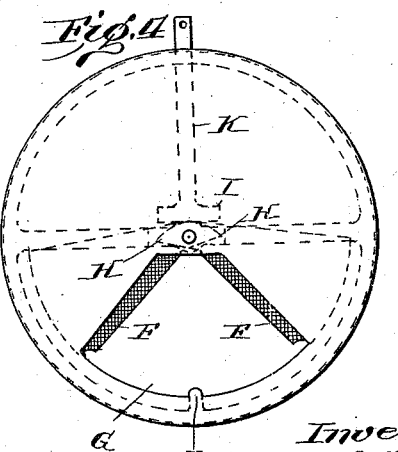
Witnesses:
J. M. Fowler Jr.
Alexander Stewart
Inventor
Orange O. Ozias
by Church & Church
his Att'ys

UNITED STATES PATENT OFFICE.

ORANGE O. OZIAS, OF DAYTON, OHIO, ASSIGNOR TO THE COMPUTING SCALE COMPANY, OF DAYTON, OHIO, A CORPORATION OF OHIO.

SCALE.

SPECIFICATION forming part of Letters Patent No. 688,963, dated December 17, 1901.

Application filed November 28, 1900. Serial No. 38,039. (No model.)

*To all whom it may concern:*

Be it known that I, ORANGE O. OZIAS, of Dayton, in the county of Montgomery, State of Ohio, have invented certain new and useful Improvements in Scales; and I do hereby declare the following to be a full, clear, and exact description of the same, reference being had to the accompanying drawings, forming a part of this specification, and to the letters of reference marked thereon.

This invention relates to an improvement in weighing or weighing and price scales such as employ a beam and counterweight for counterbalancing the weight of the goods to be weighed, and has for its object to provide an improved indicating device whereby the salesman will be warned or notified just before the desired quantity of goods has been placed on the scale, being thereby enabled to weigh out the exact quantity without the necessity of removing any of the goods, as is now customary. While this is the primary object of the invention and while the structure illustrated and to be hereinafter described is designed with the above special object in view, it will be understood that the invention is applicable in connection with scales generally whereon it is desired to indicate an approximation to the balancing-point or the failure to remove the entire quantity of goods from the scale after weighing, as is well understood in the art.

In the accompanying drawings, Figure 1 is a side elevation of a scale beam and indicator embodying my present improvements. Fig. 2 is a similar view of the indicator with the wings or vanes in a different position. Figs. 3 and 4 are views of the indicator on an enlarged scale, the parts being in the positions shown in Figs. 1 and 2, respectively.

Similar letters of reference in the several figures indicate the same parts.

For the purpose of illustrating my present invention I have adopted a type of scale-beam employed on scales which are commonly known as "price-scales," although it will be understood that the invention is capable of a universal application to any of the ordinary types of scales, and hence I do not wish to be limited because of the illustration of a particular type.

In said drawings the letter A indicates a beam suitably pivoted on a center at B and having a sliding poise C for counterbalancing the weight of the goods, although it will be understood that in lieu of the counterpoise C a pendant D may be employed for the reception of supplemental weights, or supplemental weights may be connected with the beam in any usual or preferred manner for counterbalancing the weight of the goods being weighed. In proximity to the beam or in such relation thereto that it may be readily controlled by the beam is an indicating device, which indicating device consists, generally speaking, of a movable wing or vane which by its movement will indicate to the salesman that the weight of the goods placed on the scale has nearly reached the balancing limit, or, on the other hand, when the adjustment is properly made will indicate that all of the goods have not been removed from the scale, but that some remains to be yet removed. It is desirable to provide an indicator which will give an indication which cannot be misinterpreted and which will be so plain and obvious that it will not be disregarded by the salesman, and for this purpose it is preferable to employ an indicator which will interpose but a very slight resistance to the movement of the beam and at the same time will so change the relation of visible parts of the indicator as to expose or cover as large an area as possible. As a most convenient mechanism for accomplishing this end I have adopted a double wing or vane arrangement in which very light wings or vanes are employed suitably mounted on a pivotal center and movable toward and from each other, the connection or operative relation with the beam being established through a short arm or arms, with which the beam or an operating device controlled thereby engages, so as to move the shutters in opposite directions as the beam moves up or down to either expose the wings or vanes to view or move them so as to conceal them and expose a background or space which is covered by them in their first position. Obviously the position of the vanes or wings may convey the desired information or serve for the indicating without said vanes being concealed by their movement; but the latter arrangement is preferred, inasmuch as it constitutes a more striking indicator and one not likely to be disregarded by the salesman.

In the type of scale illustrated to show the application of the invention a housing E is formed adjacent the outer or free end of the beam, which housing has pivoted within it a pair of wings, vanes, or shutters F, movable in arcs toward and from each other, so as to close or open a sight-opening G in the housing, such shutters being preferably of such shape and so counterbalanced as to require but little power for moving them in either direction, being preferably weighted slightly at the outer ends, so as to close automatically. The inner ends of the shutters are formed or connected with projecting arms H, preferably having their upper surfaces rounded and adapted to contact with the flat under surface of an operating-block I, which latter is connected with the beam through a stem K, the connection being preferably a pivotal or loose connection at $k$. The formation of the rounded surfaces of the arms is preferably such that the shutters will close slowly, the point of contact with the projection on the beam moving progressively farther from the pivot of the shutter as the shutter closes and requiring proportionately less and less power to hold the shutter against closing. In the preferred arrangement the operating-block I and its stem K are adjusted or weighted to be in balance with the beam A when the latter is in normal balance without a load being present and with the poise or supplemental weights exerting no influence to put the beam out of balance, while the shutters are so adjusted as to exert a slight upward pushing tendency throughout a portion only of the movement of the beam and exerted only before said shutters are closed or in contact with each other or the stop L, which normally arrests their closing movement. This power exerted by the shutters or wings, it will be understood, ceases when the block I moves out of contact with the arms H, and from that point on the beam is free and operates as does the ordinary beam in coming to a balance. The power exerted by the shutters in this practical embodiment of the invention illustrated is less than any load likely to be weighed on the scale and may operate only throughout, say, the thirty-second of an inch of the movement of the beam in starting from its underbalancing position to its balancing position. In operation now when the poise is moved out or counterweights are applied to the beam to balance a load of the desired weight the outer end of the beam is moved downwardly and as a result the shutters are separated or moved back within the casing. When the load is applied to the scale, as said load approaches the limit which will be counterbalanced by the poise or supplemental weights the beam will begin to move, and at the first movement the shutters will close, thereby indicating to the salesman that he has approached a balancing-point and must add only a slight quantity in order to bring the scale to a perfect balance.

In the preferred type of indicator the shutters are of a color contrasting with the background of the sight-opening. Thus said shutters may be black and the background white, and the salesman will know after he has set the scale that when the black background appears care must be taken in adding the remaining portion of the load, so that no overloading will occur and the desired weight of goods only be put on the scale. This enables him to facilitate the weighing operation, as it seldom or never becomes necessary for him to remove any of the goods after the same have been put on the scale, as is so often necessary when weighing with scales where no indicator is employed.

The type of indicator employed by me in accordance with my present invention is highly advantageous, inasmuch as it gives a positive and very marked indication, and by making the area exposed or covered large the salesman's attention will be invariably arrested without a close observation of the movement of the beam itself, as has heretofore been necessary.

Having thus described my invention, what I claim as new, and desire to secure by Letters Patent, is—

1. The combination with a scale-beam, of an indicator embodying a casing having a sight-opening, a pivoted wing having an extended surface and movable in said casing from a position in front of said sight-opening to a position out of line with said opening whereby it may be concealed by the casing, and operative connections between the wing and scale-beam when the beam is underbalanced by the weight of the load, whereby the wing is held out of sight and as the beam approaches the balancing-point, said wing is brought into sight and its connection with the beam broken, allowing the beam to reach a balance without being influenced by the wing; substantially as described.

2. In a scale, the combination with a beam mounted on a pivotal center with means for applying counterpoise weight to said beam for counterbalancing the load, of an indicator embodying a plurality of simultaneously-movable wings or vanes, an operating projection movable with the beam and coöperating with said wings or vanes to move them simultaneously throughout a portion of the movement of the beam whereby a striking visual indication is given; substantially as described.

3. In a scale, the combination with a beam mounted on a pivotal center with means for applying counterpoise weight to said beam for balancing the load, of an indicator embodying oppositely-movable pivoted wings or vanes, an operating projection carried by the beam and coöperating with said wings or vanes throughout a portion only of the movement of the beam for moving them simultaneously in opposite directions; substantially as described.

4. In a scale, the combination with a beam mounted on a pivotal center with means for applying counterpoise weight to said beam to balance the load, of an indicator embodying a fixed casing, oppositely-movable wings or vanes pivotally mounted in said casing and having oppositely-projecting operating-arms, of a block connected with the beam and cooperating with said operating-arms throughout a portion only of the movement of the beam, and a sight-opening in the casing through which said wings or vanes are exposed when the beam is in one position; substantially as described.

ORANGE O. OZIAS.

Witnesses:
 EDWIN C. JAMES,
 CHARLES W. JAMES.